United States Patent [19]

Deinlein-Kalb

[11] 4,004,604
[45] Jan. 25, 1977

[54] METHOD OF AND APPARATUS FOR DRAINING CONDENSATE FROM A STEAM-CONTAINING SYSTEM

[76] Inventor: Hans Deinlein-Kalb, Frankenstrasse 81, Nurnberg, Germany

[22] Filed: Jan. 5, 1976

[21] Appl. No.: 646,586

Related U.S. Application Data

[63] Continuation-in-part of Ser. No. 513,590, Oct. 10, 1974, abandoned.

[52] U.S. Cl. .............................. 137/183; 137/204
[51] Int. Cl.² .......................................... F16T 1/00
[58] Field of Search .......................... 137/183, 204

[56] References Cited

UNITED STATES PATENTS 3,018,023  1/1962  Talarico .................. 137/183 X

FOREIGN PATENTS OR APPLICATIONS 22,468   1/1965  Japan ........................ 137/183
432,385  7/1935  United Kingdom ............. 137/183

*Primary Examiner*—Alan Cohan
*Attorney, Agent, or Firm*—Ross, Ross & Flavin

[57] ABSTRACT

Apparatus for draining a condensate from a steam-containing system. A cascade section is adapted for connection to or into the system and provides two throttle points with a pressure chamber therebetween and a valve body disposed in the pressure chamber, same being sensitive to any changes in the physical nature of the medium in the cascade section between the vapor and liquid phases so as to be effective to open the cascade section and permit a liquid flow and yet prevent a vapor flow therethrough.

3 Claims, 3 Drawing Figures

METHOD OF AND APPARATUS FOR DRAINING CONDENSATE FROM A STEAM-CONTAINING SYSTEM

This application is a continuation-in-part of parent application Ser. No. 513,590 filed Oct. 10, 1974, now abandoned.

The invention concerns methods of and various apparatus for draining a condensate from such as a pipeline or steam-operated equipment.

Stated in another way, the primary aim of the invention is to provide a valve steam trap which is simple in its construction and is operative independently of the pressure medium temperature. Thus it is possible to use the trap with cold liquids which may for example be abstracted from air or gas conducting fittings.

Known thermal or thermodynamic traps or separators work satisfactorily only over a narrowly-restricted pressure/temperature range. They cannot be used universally. In the case of float-type steam traps, the necessary valve adjusting forces cannot properly be applied in a high pressure range; thermodynamic separators can be used only in a low pressure range.

The invention provides methods of and various apparatus for draining condensate from steam-bearing pipelines and for sensing the physical condition of the pressure medium.

The invention also provides a standard form of apparatus usable over an entire pressure range, and by which an external stepless adjustment of "open-control-close" operations is allowed.

In a cascade section, adapted to be connected to a steam-containing system and provided with two throttle points with a pressure chamber therebetween (wherein at least one of the throttle points is adjustable), the pressure difference which occurs in the pressure chamber, upon a change of the condition of the flow medium, is caused to act on the closure body of a valve-shaped shut-off member.

Typical apparatus suitable for carrying out the method is characterized by a piston-shaped valve closure body mounted in a valve housing and slidable in a separate cyclindrical pressure chamber which the valve closure body effectively shuts off against the remaining valve chamber and which has an adjustable throttle connection to the flow-off side of the valve housing.

The apparatus is further characterized by a throttle connection from the inlet side of the valve housing to the pressure chamber with a valve piston having a diameter graduation and being slidable in the cylinder.

The throttle effect of the throttle point upstream of the pressure chamber is viscosity-dependent to a substantially greater extent than the throttle point situated downstream, the viscosity-dependent effect of the throttle point situated upstream being brought about by a comparatively great length of the throttle point as compared with the cross-section thereof.

Figure 1:
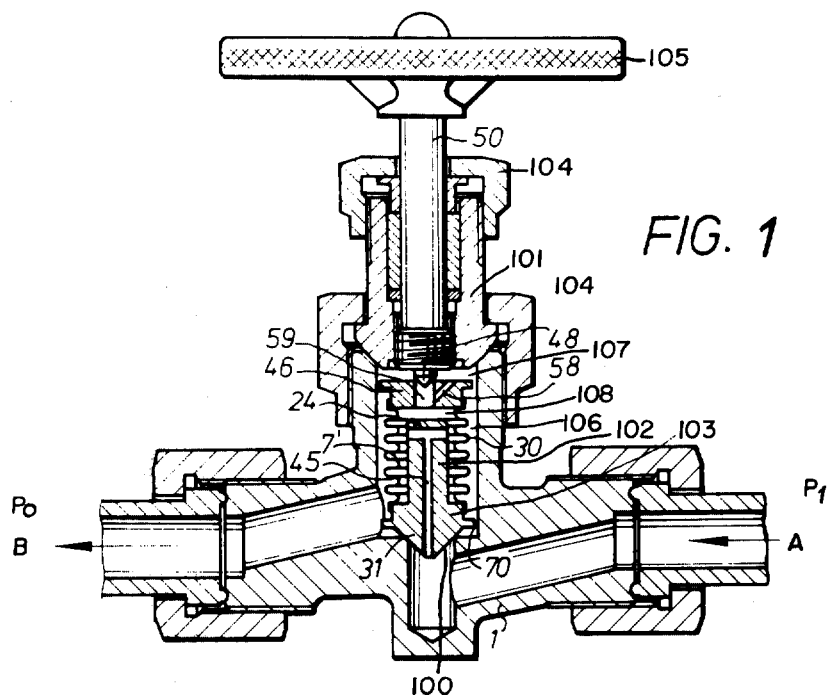
FIG. 1 is a view, in section, showing the apparatus of the invention.

In FIG. 1, an apparatus is illustrated which is adapted to be clamped into a pipeline as a steam trap between a pair of opposed flanges.

The apparatus is adapted to receive a pressure medium, such as steam, in the direction indicated by the arrows.

In the steam trap shown in FIG. 1, use is made of the commercially-available components of a straight through valve with the flow direction through housing 1 being as indicated by the arrows through inflow side or point of entry A when the pressure medium, such s steam, enters and pressure $P_1$ and outwardly of flow off side or point of exit B where the pressure medium exits at a pressure $P_o$.

A bellows 30 of a resiliently elastic metal has a valve cone 31 secured thereto at its lower end by a secure weldment.

The valve cone 31 cooperates with a valve seat 100 and projects with an elongated, narrow shank 102 into the bellows 30.

The valve cone 31 has a long, narrow axially-extending bore which serves as a viscosity-dependent restrictor and opens into a transverse bore 106 which leads into pressure chamber 7' inside of bellows 30.

On the side averted from valve cone 31, a pressure plate 46 is welded tightly to bellows 30, said pressure plate 46 having a central bore 59 from which a short throttle bore 58 leads into the chamber 107, in other words to flow-off side B.

On the side of housing 1 opposite valve seat 100, a threaded busy 101 is fastened by means of a union nut 104 to housing 1.

In threaded bush 101, a threaded spindle 50 can be adjusted in an axially-screwing manner by means of a handwheel 105. On its side lying opposite handwheel 105, threaded spindle 50 has a pin-shaped extension 48 having a conical tip which is insertable into the bore 59 from the free opening side.

The valve element consisting substantially of components 46, 30, 31 is forced by bellows 30, which is under a resilient bias, on the one hand with valve cone 31 against seat 100 and on the other hand with pressure plate 46 against tip 48p.

The valve element has no fixed connection of any kind with any other component part of the steam trap. The valve element 46, 30, 31 is guided by the tip of valve cone 31 in collaboration with valve seat 100 and by extension 48 in collaboration with bore 59.

Circumstances permitting, the collar 70 on valve cone 31 and the collar on pressure plate 46 can contribute to a certain extent to the guidance.

The vicosity-dependent throttle point is designed as a narrow and long bore 45 which extends through valve cone 31. Bellows 30 is fastened at its other end to a pressure plate 46 which has a central bore 59 into which an extension 48 of a valve spindle 50 engages by a conical end as an abutment substantially to seal the central bore 59.

Formed within bellows 30 is a pressure chamber 7' which is connected, via a short throttle bore 58 in the pressure plate 46, to the flow-off side of the trap.

The setting of the trap to enable it to perform its three different functions can be effected simply by the actuation of the valve spindle 50. Upon complete shutting-off of the trap by means of the valve spindle 50, an extension 24 of the valve cone 31 seals the central bore 59 with its axial surface, thereby at the same time closing the bore 58 in the pressure plate 46.

Figure 2:
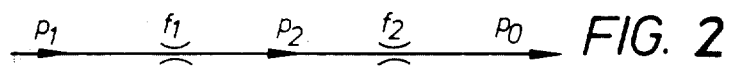
FIG. 2 is a diagrammatic showing of the passage of steam or condensate through the apparatus.

A simplified cascade section is depicted in FIG. 2, in which connection $p_1$ designates the inflow pressure, $f_1$ designates the area of the throttle bore 45, $p_2$ designates the pressure in chamber 7', $f_2$ designates the aperture cross-section of flow-off bore 58, and $p_o$ designates the counter-pressure (low pressure).

Figure 3:
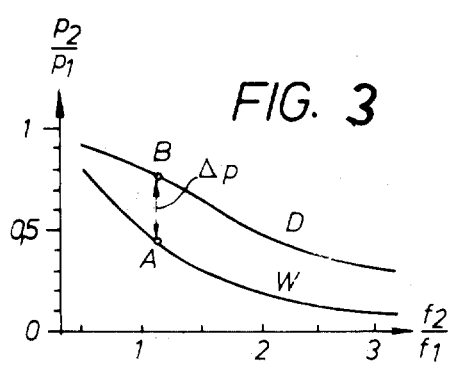
FIG. 3 is a graphic presentation plotting the ratio of fluid and vapour pressures against the ratios of the areas of the two restricted passages of the apparatus shown in FIG. 1.

Depicted in FIG. 3 are two pressure characteristic curves $$\left(\frac{p_2}{p_1} \text{ over } \frac{f_2}{f_1}\right),$$

in which connection the pressure curve D = valid for gaseous pressure medium and the pressure curve W = valid for liquid pressure medium. From the representation, it is evident that with a fixedly set aperture ratio $$\frac{f_2}{f_1}$$

the cylinder pressure $p_2$ in the case of steam is considerably lower than in the case of vapour and the differential pressure $\Delta p = (B - A)$ amounts to up to about 30% of the pressure $p_1$. Thus, by suitable choice of the area ratio of the throttle bores, this pressure difference can be utilized for the automatic opening or closing of the valve, depending on whether condensate or vapour is present.

The mode of operation of the steam trap as a shut off valve is as follows:

When the threaded spindle 50 is screwed into the closure position — in other words downwards in the drawing —, then the spindle extension 48 forces the pressure plate 46 against the extension 24 of the valve cone 31. The gap 108 between the parts 46 and 24 is in so doing reduced to a smallest value. Practically it becomes nil and the valve cone 31 is forced securely into its seat 100. Consequently, on the one hand the bores 59 and 58, on the other hand the seat 100, are sealed. Thus any passage from A to B is shut off.

The mode of operation of the steam trap as an automatic steam trap is as follows:

For the automatic abstraction of the condensate, the valve spindle 50 is brought into a normal control position. Such a control position is shown in the drawing. In such a control position, the resilient metal bellows 30 has forced the pressure plate 46 away from the extension 24. Thus a gap 108 is present between 24 and 46.

The pressure medium presses from A against the valve cone 31. This is lifted off from the valve seat 100 in the shown control position of the spindle 50. Consequently, pressure medium can flow over from A to B. If the pressure medium is liquid, then a low pressure occurs within the bellows 30 in the pressure chamber 7' thereof in accordance with the illustrated cascade pressure curve shown in FIG. 3. This pressure is not in a position to force the valve cone 31 back onto the seat 100. The through-flow from A to B thus remains opened. In this connection, the valve element is supported axially with the pressure plate 46 against the spindle extension 48.

If a gaseous pressure medium flows through the bores 45 and 58, then a high pressure occurs in the pressure chamber 7' in accordance with the cascade pressure curves in FIG. 3. This high pressure, which acts on the larger bellows inner surface overcomes the opening force of the inlet pressure $p_1$ on the inflow side A and therefore forces the valve cone 31 securely onto the seat 100. The valve cone 31 remains in its closure position until again liquid pressure medium flows through the measuring bores 45 and 58.

The mode of operation of the steam trap as an opening valve is as follows:

Through the pressure of the pressure medium on the inflow side A, the valve element consisting of the parts 46, 30, 31 is forced with the pressure plate 46 still against the extension 48. If now the valve spindle 50 is adjusted to such an extent in the opening direction that the pressure plate 46 comes into abutment against the front side of the threaded bush 101, then upon further adjustment of the spindle 50 in the sense of an opening the spindle extension 48 opens the bore 59. Consequently, the pressure prevailing in the inner space of the bellows 30 is lowered to such an extent that the inlet pressure $p_1$ occurring from A completely opens the valve cone 31, namely irrespective of the pressure medium state.

Now with reference to the schematic showing of FIG. 3, I have illustrated a simplified cascade section wherein $p_1$ represents the flow-in pressure, hereinafter referred to as the high pressure, $f_1$ represents the cross-sectional area of the throttle bore 6, $p_2$ represents the pressure in the cylinder 7, $f_2$ represents the cross-sectional area of the opening of the flow-off bore 8, and $P_o$ represents the flow-off pressure, hereinafter referred to as the low or outlet pressure.

Accordingly, it is to be appreciated that, by a suitable selection of the ratio of the operative surfaces of differential piston 3, use can be made of this pressure difference to effect automatic valve opening and closing depending upon the presence of condensate or steam.

By way of exemplification, let it be assumed that the ratio of the areas of the effective surfaces of the differential piston 3 is selected as being approximately 1:1.3, approximately the same size opening and closing forces act on the piston when water or steam flows through the cascade.

Thus, in the case of a steam trap of nominal width 15 and a pressure $p_1 = 50$ bar, the opening force, (arising from the condensate) acting on piston 3 amounts to 28 kp and the closing force (arising from steam) amounts to 31 kp. The free valve adjusting forces (here $\Delta p = 59$ kp) behave in linear proportion to pressure $p_1$ and are of an order of magnitude which overcomes almost any possible piston friction arising from any use of piston rings on the piston for example.

The steam trap works in the aforesaid mode of operation as a two-point controller. Proportional damping is achieved, if piston rod 10 is conical in design, so that, with an increase of the opening of piston 3, throttle gap 10' is reduced relative to the piston rod guideway in housing 1, and vice versa.

I claim:

1. In a piping system supporting a pressure medium in the form of a gas or vapour, an apparatus for determining the pressure of a liquid in the pressure medium and automatically draining the same therefrom and being operative independently of the pressure and temperature of the pressure medium comprising:

a valve having a flow direction therethrough from an inflow to an outflow with a valve seat therebetween, an axially-adjustable spindle, a bush interengaged with the housing and threadedly engageable with the spindle opposite the valve seat, a valve cone disposed between the valve seat and spindle and having a head seating on the valve seat and an elongated shank extendable away therefrom, a resilient bellows fixed to the valve cone and circumscribing the valve cone shank in a spaced relationship defining a pressure chamber therebetween, the valve cone having an axially-extending through bore, a pressure plate fixed to the bellows and defining a gap between the valve cone shank and pressure plate, the valve cone having a narrow central throttle opening with the length thereof being a multiple of the diameter thereof, the throttle opening communicating with a transverse opening leading to the pressure chamber between the bellows and shank, the pressure plate having a central opening therethrough and a communicating relatively short throttle opening disposed obliquely to the outer end of the pressure plate leading to the gap between the valve cone shank and pressure plate, the spindle having a conical tip extendable into the pressure plate through opening.

2. In the apparatus as set forth in claim 1, including:

an upstream throttle point upstream of the pressure chamber and adjacent the inflow side and being formed by the through bore in the valve cone, a downstream throttle point downstream of the pressure chamber and adjacent the outflow side and being formed by the through opening in the pressure plate.

3. In the apparatus as set forth in claim 2 including the pressure chamber having a greater effective surface area in its diameter than the valve cone, the pressure chamber having the outlet throttle connected to the flow-off side of the valve, the throttle bore from the inlet side of the shut-off member to the pressure chamber being arranged behind the valve closure body.

* * * * *